(12) United States Patent
Kang et al.

(10) Patent No.: US 11,131,244 B2
(45) Date of Patent: Sep. 28, 2021

(54) POWER TRANSMISSION SYSTEM AND GAS TURBINE ENGINE COMPRISING THE SAME

(71) Applicant: General Electric Company, Schenectady, NY (US)

(72) Inventors: Weize Kang, Evendale, OH (US); Richard Alan Wesling, West Chester, OH (US); Tod Robert Steen, Evendale, OH (US); Richard Schmidt, Evendale, OH (US)

(73) Assignee: General Electric Company, Schenectady, NY (US)

( * ) Notice: Subject to any disclaimer, the term of this patent is extended or adjusted under 35 U.S.C. 154(b) by 335 days.

(21) Appl. No.: 15/803,063

(22) Filed: Nov. 3, 2017

(65) Prior Publication Data

US 2019/0136764 A1 May 9, 2019

(51) Int. Cl.
*F02C 7/06* (2006.01)
*F01D 25/04* (2006.01)
*F02C 3/04* (2006.01)
*B64C 27/12* (2006.01)
*F16F 9/10* (2006.01)

(52) U.S. Cl.
CPC ............... *F02C 7/06* (2013.01); *F01D 25/04* (2013.01); *B64C 27/12* (2013.01); *F02C 3/04* (2013.01); *F05D 2220/32* (2013.01); *F05D 2240/50* (2013.01); *F05D 2240/60* (2013.01); *F05D 2240/61* (2013.01); *F05D 2260/4031* (2013.01); *F05D 2260/96* (2013.01); *F05D 2300/432* (2013.01); *F16F 9/106* (2013.01); *F16F 2222/12* (2013.01)

(58) Field of Classification Search
CPC . F02C 7/06; F01D 25/04; F01D 25/06; F05D 2240/50; F05D 2240/61; F05D 2240/90; F05D 2260/96
USPC ................................. 415/110, 111, 119, 229
See application file for complete search history.

(56) References Cited

U.S. PATENT DOCUMENTS

| | | | |
|---|---|---|---|
| 5,110,257 A * | 5/1992 | Hibner | F01D 25/164 415/119 |
| 5,233,624 A * | 8/1993 | LaPlante | H01S 3/025 372/69 |
| 6,234,912 B1 | 5/2001 | Koschier et al. | |
| 6,451,017 B1 * | 9/2002 | Moutafis | A61B 17/32037 604/35 |
| 6,715,993 B2 | 4/2004 | Wojciechowski et al. | |
| 7,384,239 B2 | 6/2008 | Wacinski | |
| 7,644,572 B2 | 1/2010 | Labala | |
| 8,167,531 B2 | 5/2012 | Mollmann et al. | |

(Continued)

FOREIGN PATENT DOCUMENTS

| CN | 200910223742 | 5/2011 |
|---|---|---|
| CN | 102005855 | 11/2012 |

*Primary Examiner* — Logan M Kraft
*Assistant Examiner* — Robert A Werner
(74) *Attorney, Agent, or Firm* — Dority & Manning, P.A.

(57) ABSTRACT

A power transmission system includes a shaft, a stator disposed within the shaft and substantially concentric with the shaft; and at least one supporting element positioned between the stator and the shaft and configured to support the shaft on the stator to reduce a vibration of the shaft and allow the shaft to rotate relative to the stator. A gas turbine engine including the power transmission system is also described.

19 Claims, 8 Drawing Sheets

(56) References Cited

U.S. PATENT DOCUMENTS

| | | |
|---|---|---|
| 8,191,352 B2 | 6/2012 | Schilling |
| 9,551,049 B2 | 1/2017 | Shah et al. |
| 9,677,659 B1 | 6/2017 | Niergarth et al. |
| 2002/0067871 A1* | 6/2002 | Bos .................... F16C 27/045 |
| | | 384/99 |
| 2007/0084187 A1 | 4/2007 | Moniz |
| 2007/0087892 A1 | 4/2007 | Orlando |
| 2008/0134657 A1 | 6/2008 | DiBenedetto |
| 2008/0148708 A1 | 6/2008 | Chou |
| 2008/0292234 A1* | 11/2008 | Wada ................ F16F 15/0237 |
| | | 384/582 |
| 2012/0159964 A1 | 6/2012 | Huang |
| 2012/0213629 A1* | 8/2012 | Rouesne ............. F01D 25/164 |
| | | 415/170.1 |
| 2015/0033890 A1 | 2/2015 | Pettinotti |
| 2015/0219076 A1 | 8/2015 | Wendeberg |
| 2015/0330251 A1* | 11/2015 | Hanrahan ................ F01D 1/18 |
| | | 415/1 |
| 2016/0069186 A1 | 3/2016 | McDonagh |
| 2017/0058697 A1 | 3/2017 | Copeland |
| 2017/0122205 A1 | 5/2017 | Ertas |
| 2017/0145857 A1* | 5/2017 | Pikovsky ................ F01D 25/18 |
| 2017/0335767 A1* | 11/2017 | Gysling ................... F02C 7/06 |
| 2018/0051706 A1* | 2/2018 | DiBenedetto ......... F01D 25/162 |
| 2019/0153978 A1* | 5/2019 | Dievart .................... F02K 3/06 |

\* cited by examiner

POWER TRANSMISSION SYSTEM AND GAS TURBINE ENGINE COMPRISING THE SAME

BACKGROUND

Embodiments of the disclosure relate generally to a power transmission system, and more particularly relate to a power transmission system used in gas turbine engines.

A power transmission system used in rotating machines, such as gas turbines, turbofans and auxiliary power generators, usually includes a shaft which is long and configured to transfer power to a fan in front of engines or a propeller of helicopter engines. The shaft may rotate at different speeds to perform desired functions. When the shaft is operated at supercritical speeds, it may lead to high vibration and whirl instability, and increase shaft bending stresses and dynamic bearing loads, which may result in excessive wear, or premature failure of components of the machines.

It has been observed that such negative effects may be compensated for by the following approaches. One approach is utilizing a stiffer shaft, and another approach is adding dampers outside the shaft. However, a stiffer shaft usually requires a specialized and expensive material or a larger and heavier form, and adding dampers outside the shaft usually requires an additional space designed for the dampers, which is not a good option due to the limited space inside the gas turbines.

Therefore, it is desirable to provide a power transmission system to address at least one of the above-mentioned situations.

BRIEF DESCRIPTION

In accordance with one embodiment disclosed herein, a power transmission system includes a shaft, a stator and at least one supporting element. The stator is disposed within the shaft and substantially concentric with the shaft. The supporting element is positioned between the stator and the shaft and configured to support the shaft on the stator to reduce a vibration of the shaft and allow the shaft to rotate relative to the stator.

In accordance with another embodiment disclosed herein, a gas turbine engine includes a high-pressure compressor; a combustor in which mixed fuel with pressurized air by the high-pressure compressor to generate combustion gases; a high-pressure turbine coupled to the combustor through a high-pressure shaft, and the combustion gases flown downstream through the high-pressure turbine to a low-pressure turbine; a low-pressure shaft connected the low-pressure turbine to either a fan rotor or a power equipment; a stator disposed within the low-pressure shaft and substantially concentric with the low-pressure shaft; and at least one supporting element positioned between the stator and the low-pressure shaft and configured to support the low-pressure shaft on the stator to reduce a vibration of the shaft and allow the low-pressure shaft to rotate relative to the stator.

DRAWINGS

The accompanying drawings, which are incorporated herein and form part of the specification, illustrate the present disclosure and, together with the description, further serve to explain the principles of the disclosure and to enable a person skilled in the relevant art(s) to make and use the disclosure.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a", and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The terms "component", "module", "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer.

Figure 1:
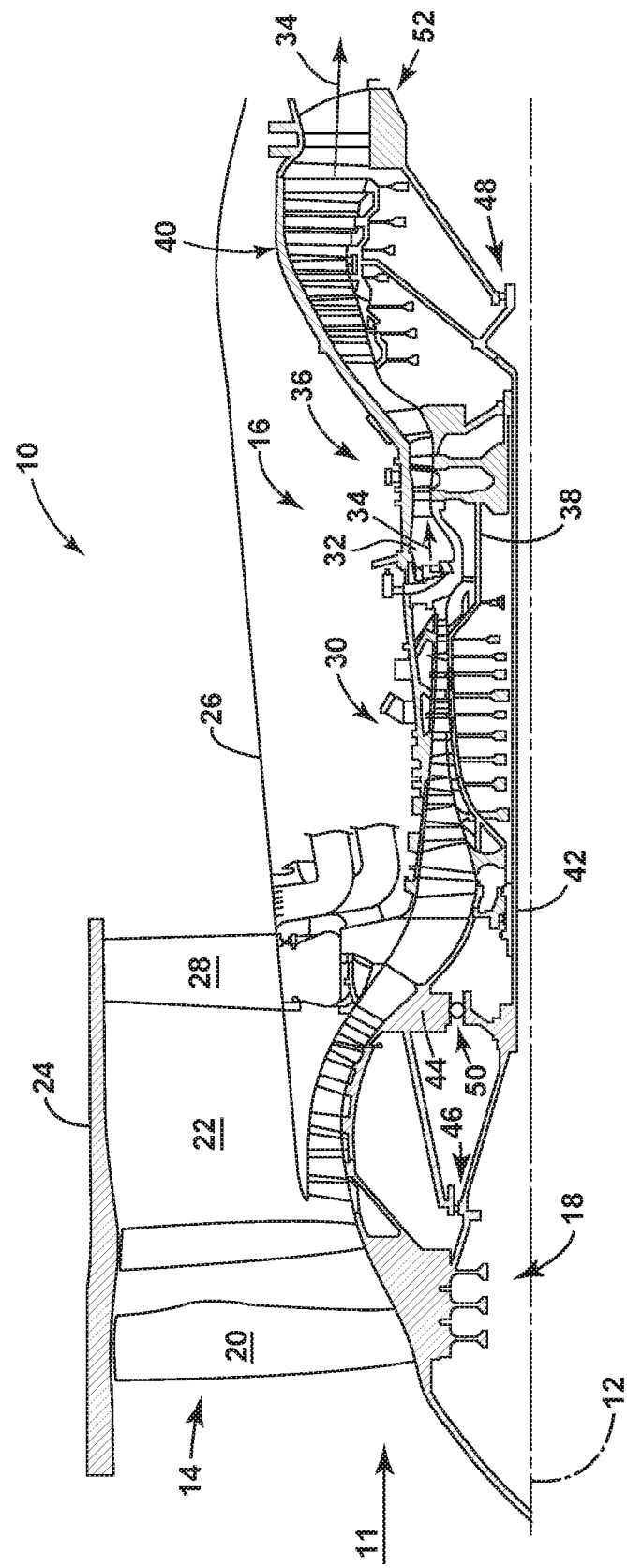
FIG. 1 is a partial cross-sectional view of an engine in accordance with some embodiments of the present disclosure.

FIG. 1 is a partial cross-sectional view of an engine 10. In some embodiments, the engine 10 is a turbofan engine suitable for use in, for example, aviation or marine applications. Alternatively, the engine 10 may be any other turbine engines and/or turbomachines, including, without limitation, gas turbine engines, stream turbine engines, turboshaft engines, centrifugal compressors, and turbocharges. Although only a portion is shown, it is to be understood that the engine 10 may be annular in form, for example about a longitudinal axis 12.

In some embodiments, as shown in FIG. 1, the engine 10 includes a fan section 14 and a core engine 16 disposed downstream from the fan section 14. The fan section 14 includes a fan rotor disk 18 carrying a plurality of circumferentially spaced radially outwardly extending fan blades 20. A bypass duct 22 is radially bounded by a fan casing 24 which surrounds the fan rotor 18 and fan blades 20. The fan casing 24 is secured to a core engine casing 26 by a plurality of circumferentially spaced radially extending fan outlet guide vanes 28. The core engine 16 includes in downstream serial flow relationship a high-pressure compressor (HPC) 30, and a combustor 32 which mixes fuel with inlet air 11 pressured by the high-pressure compressor 30 to generate combustion gases 34. A low-pressure shaft 42 connects a low-pressure turbine 40 to the fan rotor 18. The combustion gases 34 flow downstream through a high-pressure turbine 36 to the low-pressure turbine 40 for powering the fan section 14, and then the spent combustion gases 34 are discharged from the engine 10. The high-pressure turbine 36 is coupled to the compressor 30 through a high-pressure shaft 38. The low-pressure shaft 42 is rotatably secured to a structural support frame 44 with longitudinally spaced first shaft bearings 46 and 50, and the first shaft bearings 46 and 50 support the low-pressure shaft 42 on the structural support frame 44 to dampen vibrational energy imparted on the low-pressure shaft 42. A second shaft bearing 48 is operatively coupled between the low-pressure shaft 42 and a turbine rear frame 52.

In the exemplary embodiment as shown in FIG. 1, the engine 10 is a turbofan engine, and the low-pressure turbine 40 is coupled to the fan rotor 18 through the low-pressure shaft 42. But the engine 10 may have different configurations in other embodiments. For example, in some embodiments, the fan rotor 18 of the engine 10 may be replaced with power equipment, which is configured to drive helicopter rotors or propellers.

Figure 2:
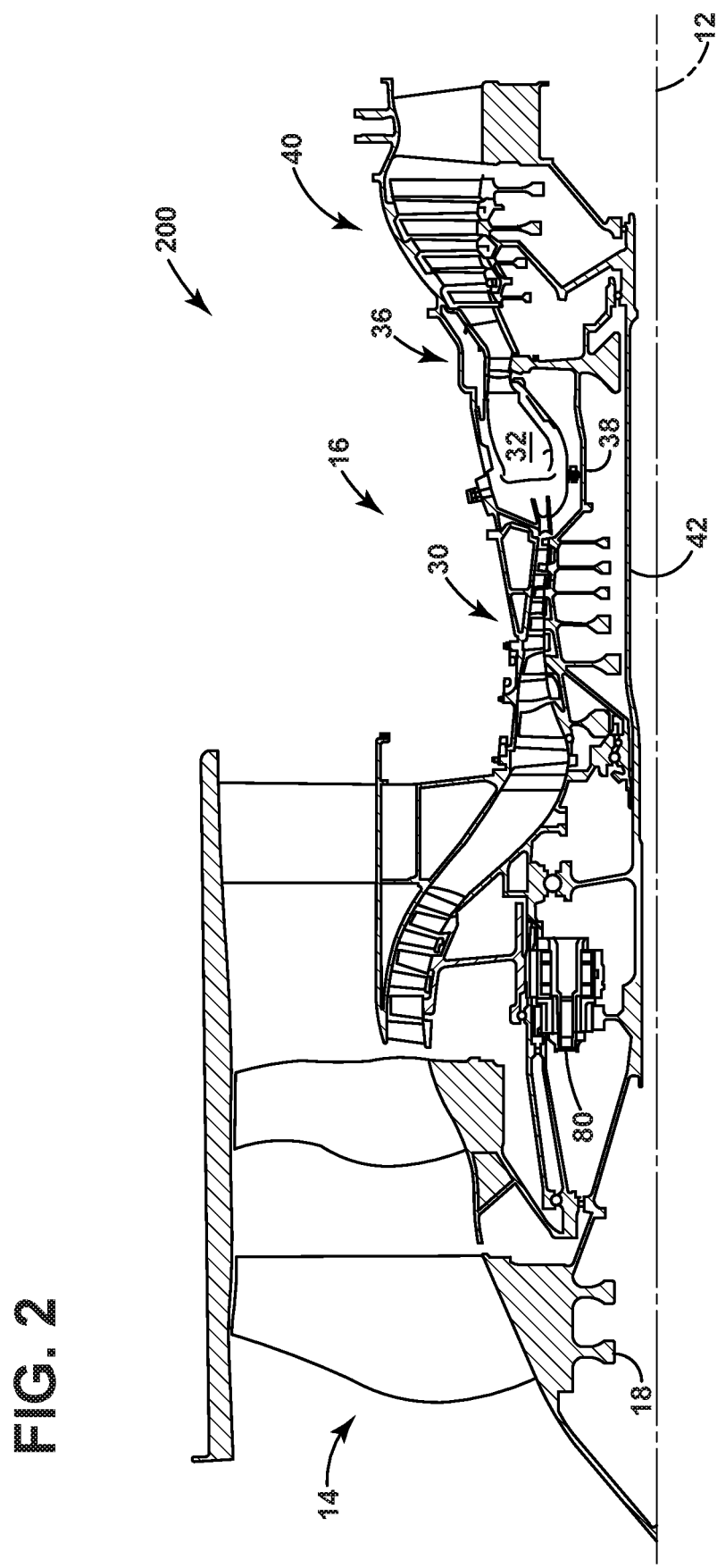
FIG. 2 is a partial cross-sectional view of an engine in accordance with some embodiments of the present disclosure.

FIG. 2 is a partial cross-sectional view of an engine 200. The engine 200 is substantially similar to the engine 10, and as such, components of FIG. 2 that are identical to components of FIG. 1 are referenced in FIG. 2 using the same reference numerals used in FIG. 1. As shown in FIG. 2, a low-pressure turbine 40 is coupled to a fan section 14 through a low-pressure shaft 42, and the engine 200 further includes a gearbox 80 coupled between the low-pressure turbine 40 and a fan rotor 18 of the fan section 14. The gearbox 80 includes a plurality of gears for adjusting the rotational speed of the fan rotor 18 and thus the fan section 14 may have a more efficient rotational fan speed relative to the low-pressure shaft 42.

Figure 3:
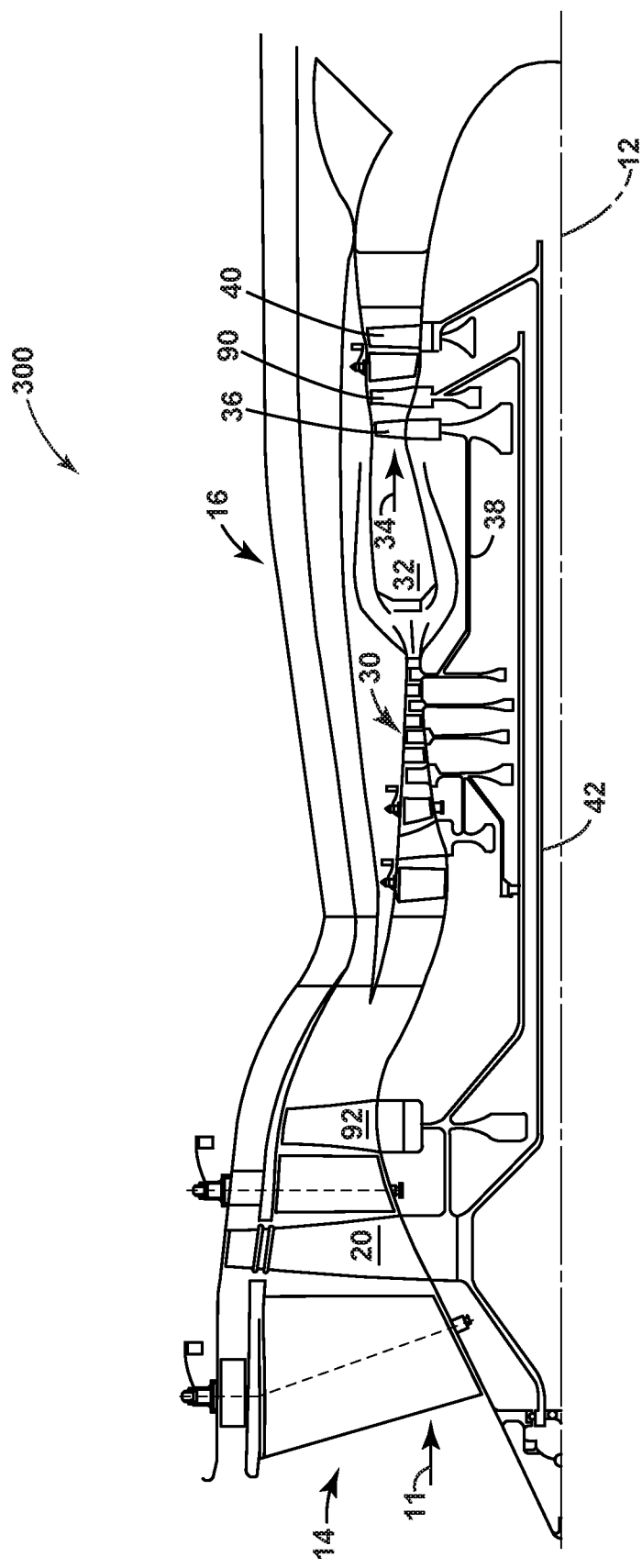
FIG. 3 is a partial cross-sectional view of an engine in accordance with some embodiments of the present disclosure.

FIG. 3 is a partial cross-sectional view of an engine 300. The engine 300 is substantially similar to the engine 10, and as such, components of FIG. 3 that are identical to components of FIG. 1 are referenced in FIG. 3 using the same reference numerals used in FIG. 1. As shown in FIG. 3, the engine 300 further includes an intermediate pressure compressor 92 and an intermediate pressure turbine 90. A portion of inlet air 11 discharged from fan blades 20 is channeled through the intermediate pressure compressor 92. Compressed air discharged from the intermediate pressure compressor 92 is channeled through a high-pressure compressor 30 and a combustor 32. The combustion gases 34 from the high-pressure turbine 36 go through the intermediate-pressure turbine 90 before flowing down to the low-pressure turbine 40.

Figure 4:
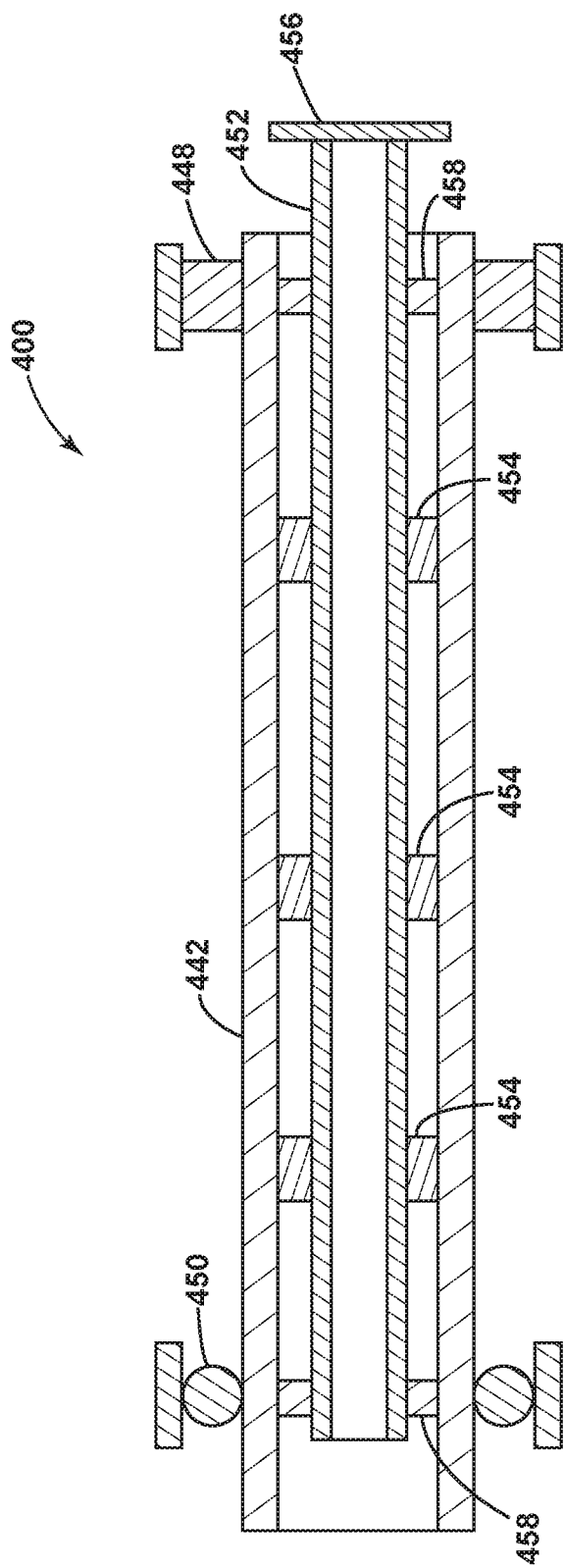
FIG. 4 is a cross-sectional view of an exemplary power transmission system in accordance with some embodiments of the present disclosure.

FIG. 4 is a cross-sectional view of an exemplary power transmission system 400 that can be used in an engine, like the engine 10 as shown in FIG. 1.

As shown in FIG. 4, the power transmission system 400 includes a shaft 442, a stator 452 and at least one supporting element 454. If the power transmission system 400 is for use in an engine, the shaft 442 may be a low-pressure shaft of the engine. If the power transmission system 400 is for other uses, the shaft 442 may be other power transmission shafts that need to be operated at supercritical speeds. The stator 452 is disposed within the shaft 442 and substantially concentric with the shaft 442, and the stator 452 is fixed to a static structure 456. In some embodiments, the static structure 456 is a frame, such as a turbine rear frame of an engine. The supporting element 454 is positioned between the stator 452 and the shaft 442 and is configured to support the shaft 442 on the stator 452 to reduce a vibration of the shaft 442 and allow the shaft 442 to rotate relative to the stator 452. The number of the supporting element 454 is an integer equal to or greater than 1, such as 1, 2, 3, 4 and etc., and in some embodiments, the number is an integer equal to or greater than 2. In the illustrated embodiment, the number is 3.

The support element 454 may be any type of structure suitable to reduce or eliminate the vibration and flexion of the shaft 442 when it is operated at a supercritical speed. In some embodiments, the supporting element 454 is selected from an oil squeeze film damper, an oil journal bearing, a bumper or a combination thereof.

In some embodiments, the power transmission system 400 further includes a pair of internal bearings 458 positioned between the stator 452 and the shaft 442 to support the shaft 442 on the stator 452. The pair of internal bearings 458 are rotatable along with the shaft 442, relative to the stator 452. In some embodiments, the supporting elements 454 are axially between the pair of internal bearings 458, and the internal bearings 458 are configured to seal a passage between the stator 452 and the shaft 442 to prevent possible oil leakage.

A diameter of the stator 452 and distances between the supporting elements 454 may have any dimensions suitable to provide supporting to the shaft 442. For example, the diameter of the stator 452 may be about 25%-75% of a diameter of the shaft 442. In some embodiments, the outer radius of the shaft 442 is about 2 inches and the inner radius of the shaft 442 is about 1.25 inches, the outer radius of the stator 452 is about 1.0 inches and the inner radius of the stator 452 is about 0.5 inches, and the distances between the supporting elements 454 are from about 5 inches to about 25 inches.

In some embodiments, the power transmission system 400 further includes a first shaft bearing 450 and a second shaft bearing 448 which are configured to couple and support the shaft 442 to at least one outer structure. In the exemplary embodiment as shown in FIG. 1, the outer structure includes the turbine rear frame 52 or the structural support frame 44.

Figure 5:
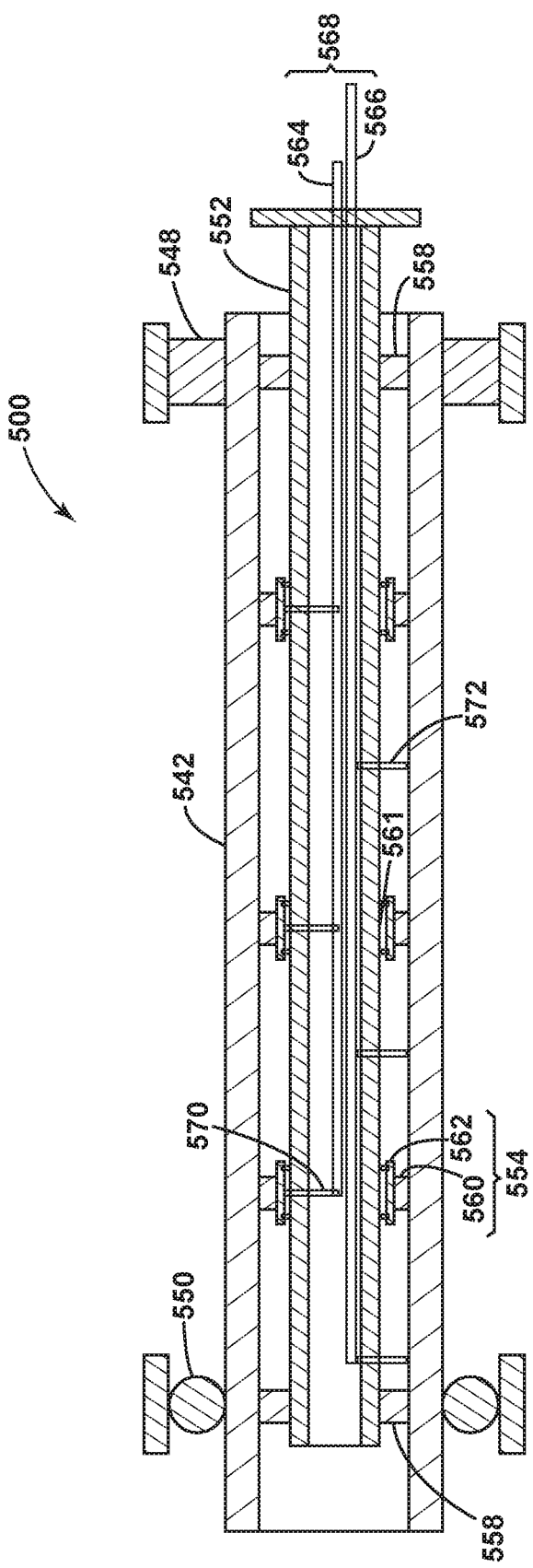
FIG. 5 is a cross-sectional view of an exemplary power transmission system in accordance with some embodiments of the present disclosure.

FIG. 5 is a cross-sectional view of an exemplary power transmission system 500. The power transmission system 500 includes a shaft 542, a stator 552, at least one supporting element 554, at least one internal bearing 558, a first shaft bearing 550 and a second shaft bearing 548. The shaft 542, the stator 552, the internal bearing 558, the first shaft bearing 550 and the second shaft bearing 548 have similar structures and functions as the embodiment in FIG. 4, which are not described herein.

In the embodiment of FIG. 5, the supporting element 554 includes an oil squeeze film damper 562 and a bearing 560. The oil squeeze film damper 562 surrounds the stator 552 and is fixed on the stator 552. The bearing 560 is coupled to the oil squeeze film damper 562 and rotatable along with the shaft 542, relative to the stator 552 and the oil squeeze film damper 562. The power transmission system 500 further includes an oil lubrication system 568 coupled to the oil squeeze film damper 562 and configured to supply oil to the oil squeeze film damper 562 and the bearing 560 for damping and lubrication. The oil lubrication system 568 includes a delivery pipe 564 and a scavenge pipe 566. At least part of the delivery pipe 564 is located within the stator 552, and the delivery pipe includes at least one inlet 570 configured to provide oil to the oil squeeze film damper 562 and the bearing 560. The number of the inlet 570 is the same as the oil squeeze film damper 562. At least part of the scavenge pipe 566 is located within the stator 552, and the scavenge pipe 566 includes at least one inlet 572 located at a bottom of the stator 552 and configured to collect oil within the shaft 542 which flows from the oil squeeze film damper 562 and the bearing 560 to prevent oil leakage. In some embodiments, the internal bearings 558 are also configured to seal a passage between the stator 552 and the shaft 542 to prevent oil leakage.

The oil lubrication system 568 further includes an oil tank (not shown), an oil delivery pump (not shown) for providing oil to the delivery pipe 564 from the oil tank, an oil scavenger pipe (not shown) communicating with the scavenger pipe 566, and an optional filter (not shown) for purifying the oil from the scavenger pipe. The oil from the filter can be recycled and returned to the oil tank. In other embodiments, the oil may be from other oil storage sections rather than the oil tank.

In some embodiments, the squeeze film damper 562 includes a groove 561 defined in the inner plain cylindrical surface and attached to the stator 552, and the groove 561 is configured to allow the oil from the delivery pipe 564 to pass. The squeeze film damper 562 also includes a slot connecting the groove 561 and an outer surface of the squeeze film damper 562 to provide oil to a junction surface of the squeeze film damper 562 and the bearing 560. The squeeze film damper 562 between the bearing 560 and stator 552 brings more support flexibility and damping in the supporting structure, as well as other advantages such as lower transmitted forces and a longer bearing life, particularly when the shaft 542 is operated at supercritical speeds. For example, in an exemplary embodiment, a shaft provided with a squeeze film damper and a bearing like the optimized squeeze film damper 562 and bearing 560, may achieve about 90%-99% reduction in shaft center motion or vibration compared with a regular supercritical shaft under the frequency from about 150 Hz to about 180 Hz. Besides lubrication, the oil is also used to reduce the thermal energy generated during rotating.

Figure 6:
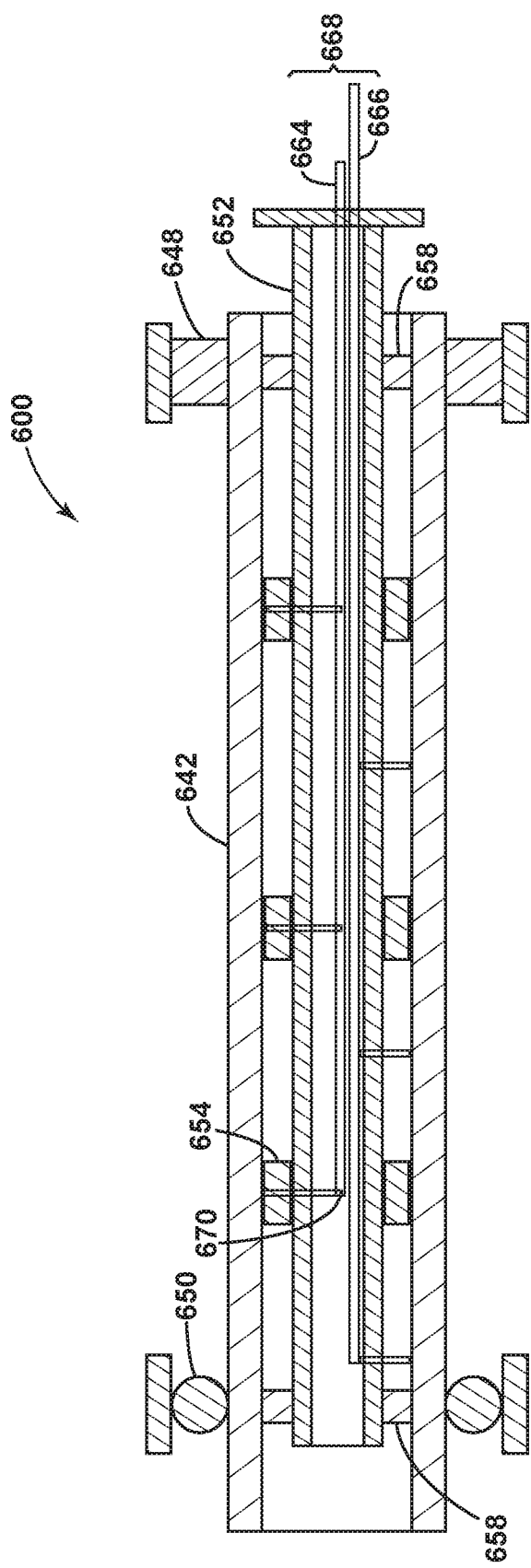
FIG. 6 is a cross-sectional view of an exemplary power transmission system in accordance with some embodiments of the present disclosure.

FIG. 6 is a cross-sectional view of an exemplary power transmission system 600. The power transmission system 600 includes a shaft 642, a stator 652, at least one oil journal bearing 654, at least one internal bearing 658, a first shaft bearing 650, a second shaft bearing 648 and an oil lubrication system 668. The shaft 642, the stator 652, the internal bearing 658, the first shaft bearing 650, the second shaft bearing 648 and the oil lubrication system 668 have similar structures and functions as the embodiment in FIG. 5, which are not described herein.

In the embodiment of FIG. 6, the oil journal bearing 654 which surrounds the stator 652 and is couple on the stator 652. The oil lubrication system 668 is coupled to the oil journal bearing 654, and the oil lubrication system 668 includes a delivery pipe 664 and a scavenge pipe 666. The delivery pipe 664 includes at least one inlet 670 configured to provide oil to an outer surface of the oil journal bearing 654, the number of the inlet 670 is the same as the oil journal bearing 654. The supplied oil is used to fill a gap between the oil journal bearing 654 and the shaft 642 for lubrication and reducing the vibration. In some embodiments, the gap may have a thickness of about 0.002 inches to about 0.01 inches.

Figure 7:
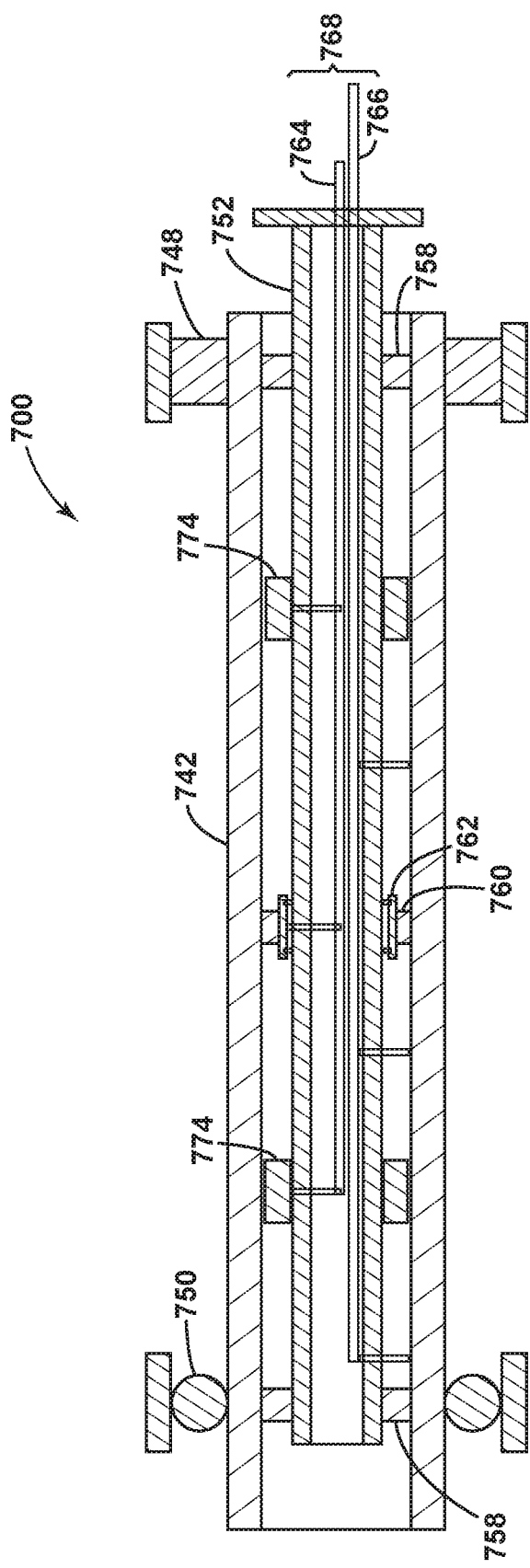
FIG. 7 is a cross-sectional view of an exemplary power transmission system in accordance with some embodiments of the present disclosure.

FIG. 7 is a cross-sectional view of an exemplary power transmission system 700. The power transmission system 700 includes a shaft 742, a stator 752, at least two supporting elements, at least one internal bearing 758, a first shaft bearing 750, a second shaft bearing 748 and an oil lubrication system 768. The supporting elements of this embodiment include at least one oil journal bearing 774 and at least one oil squeeze film damper 762 combined with a bearing 760. The oil journal bearing 774 and the oil squeeze film damper 762 can be arranged alternately or randomly.

Figure 8:
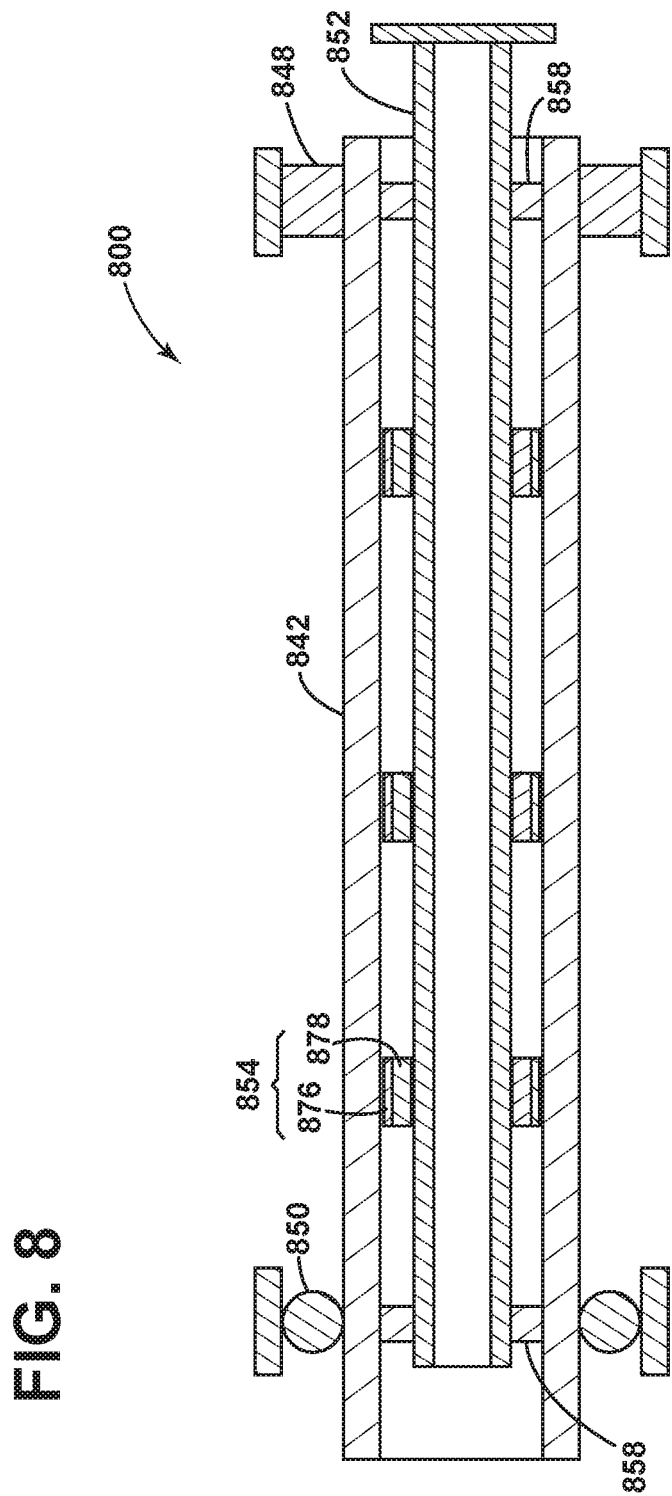
FIG. 8 is a cross-sectional view of an exemplary power transmission system in accordance with some embodiments of the present disclosure.

FIG. 8 is a cross-sectional view of an exemplary power transmission system 800. The power transmission system 800 includes a shaft 842, a stator 852, at least one supporting element, at least one internal bearing 858, a first shaft bearing 850 and a second shaft bearing 848. The shaft 842, the stator 852, the internal bearing 858, the first shaft bearing 850 and the second shaft bearing 848 have similar structures and functions as the embodiment in FIG. 4, which are not described herein.

In the embodiment of FIG. 8, the supporting element includes a bumper 854 coupled to the stator 852, and the bumper 854 includes a viscoelastic damper 878 and a low friction coating 876 for providing wear resistance and/or lubrication. The coating 876 may be of any suitable thickness in a range from about 0.002 inches to about 0.01 inches.

In some embodiments, a coefficient friction of the low friction coating 876 is less than or equal to about 0.5. For example, the low friction coating 876 is selected from a Teflon coating, a PTFE (polytetrafluoroethylene) coating, a $MoS_2$ (molybdenum disulfide) coating, a $WS_2$ (tungsten disulfide) coating, a graphite coating, a dry film lubricant coating and a combination thereof. And the coating 876 may be fabricated via any methods suitable for providing the composition and thickness of the coating, such as anodizing, plating, vapor deposition, thermal spray, plasma spray, or the like.

The above described power transmission system and gas turbine engine using the power transmission system can reduce the vibration of a shaft of the power transmission system under supercritical conditions, and avoid using expensive material or adding dampers outside the shaft.

While embodiments of the disclosure have been described herein, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A power transmission system, comprising:
   a shaft;
   a stator disposed within the shaft and substantially concentric with the shaft;

at least one internal bearing positioned between the stator and the shaft to support the stator within the shaft, wherein said internal bearing is rotatable along with the shaft, relative to the stator; and at least one supporting element different from the internal bearing positioned between the stator and the shaft, wherein each of the stator and the shaft is in contact with the at least one supporting element or oil associated with the at least one supporting element, and wherein the at least one supporting element is configured to directly support the shaft on the stator or support the shaft on the stator via the oil associated with the at least one supporting element to reduce a vibration of the shaft and allow the shaft to rotate relative to the stator.

2. The power transmission system of claim 1, wherein the shaft is a low-pressure shaft of a turbine engine.

3. The power transmission system of claim 1, further comprising a static structure, wherein the stator is fixed to the static structure.

4. The power transmission system of claim 1, further comprising at least one shaft bearing outside the shaft and coupled to a periphery of the shaft to facilitate rotation of the shaft and/or dampen vibrational energy imparted on the shaft.

5. The power transmission system of claim 1, wherein the at least one internal bearing comprises a pair of said internal bearings, and the at least one supporting element is axially between the pair of said internal bearings.

6. The power transmission system of claim 1, wherein a diameter of the stator is 25%-75% of a diameter of the shaft.

7. The power transmission system of claim 1, wherein the supporting element comprises an oil squeeze film damper, an oil journal bearing, a bumper or a combination thereof.

8. The power transmission system of claim 1, wherein the supporting element comprises an oil squeeze film damper surrounding and fixed on the stator and a bearing coupled to the oil squeeze film damper and rotatable along with the shaft, relative to the stator and the squeeze film damper.

9. The power transmission system of claim 8, further comprising an oil lubrication system coupled to the oil squeeze film damper and configured to supply oil to the oil squeeze film damper and the bearing for damping and lubrication.

10. The power transmission system of claim 8, wherein the oil lubrication system comprises a delivery pipe at least partially located within the stator and configured to provide oil to the oil squeeze film damper, and a scavenge pipe at least partially located within the stator and configured to collect oil within the shaft to prevent oil leakage.

11. The power transmission system of claim 1, wherein the supporting element comprises an oil journal bearing coupled to the stator.

12. The power transmission system of claim 11, further comprising an oil lubrication system coupled to the oil journal bearing and configured to supply oil to the oil journal bearing for lubrication.

13. The power transmission system of claim 1, wherein the supporting element comprises a bumper coupled to the stator, and the bumper is made of a viscoelastic damper with a low friction coating, wherein the coefficient friction of the low friction coating is less than or equal to 0.5.

14. The power transmission system of claim 13, wherein the low friction coating is selected from a Teflon coating, a PTFE (polytetrafluoroethylene) coating, a MoS2 coating, a WS2 coating, a graphite coating, a dry film lubricant coating and a combination thereof.

15. A gas turbine engine, comprising:

a high-pressure compressor;

a combustor;

a high-pressure turbine;

a high-pressure shaft connecting the high-pressure compressor and the high-pressure turbine;

a low-pressure shaft connecting a low-pressure turbine to either a fan rotor or a power equipment;

a stator disposed within the low-pressure shaft and substantially concentric with the low-pressure shaft;

at least one internal bearing positioned between the stator and the low-pressure shaft to support the stator within the low-pressure shaft, wherein said internal bearing is rotatable along with the low-pressure shaft, relative to the stator; and at least one supporting element different from the internal bearing positioned between the stator and the low-pressure shaft, wherein each of the stator and the low-pressure shaft is in contact with the at least one supporting element or oil associated with the at least one supporting element, and wherein the at least one supporting element is configured to directly support the low-pressure shaft on the stator or support the low-pressure shaft on the stator via the oil associated with the at least one supporting element to reduce a vibration of the shaft and allow the low-pressure shaft to rotate relative to the stator.

16. The gas turbine engine of claim 15, further comprising a gearbox coupled between the low-pressure turbine and the fan rotor.

17. The gas turbine engine of claim 15, further comprising an intermediate pressure compressor and an intermediate pressure turbine, wherein the combustion gases from the high-pressure turbine go through the intermediate-pressure turbine before flowing down to the low-pressure turbine.

18. The gas turbine engine of claim 15, wherein the power equipment is configured to drive helicopter rotors or propellers.

19. The gas turbine engine of claim 15, wherein the supporting element comprises an oil squeeze film damper, an oil journal bearing, a bumper or a combination thereof.

* * * * *